G. W. STAMBAUGH.
COUPON DELIVERY MACHINE.
APPLICATION FILED JULY 28, 1910.

976,517.

Patented Nov. 22, 1910.

5 SHEETS—SHEET 1.

Witnesses:
Chas. E. Gaylord.
Chas. H. Buell.

Inventor:
George W. Stambaugh,
By Dyrenforth, Lee, Chritton & Wiles,
Attys.

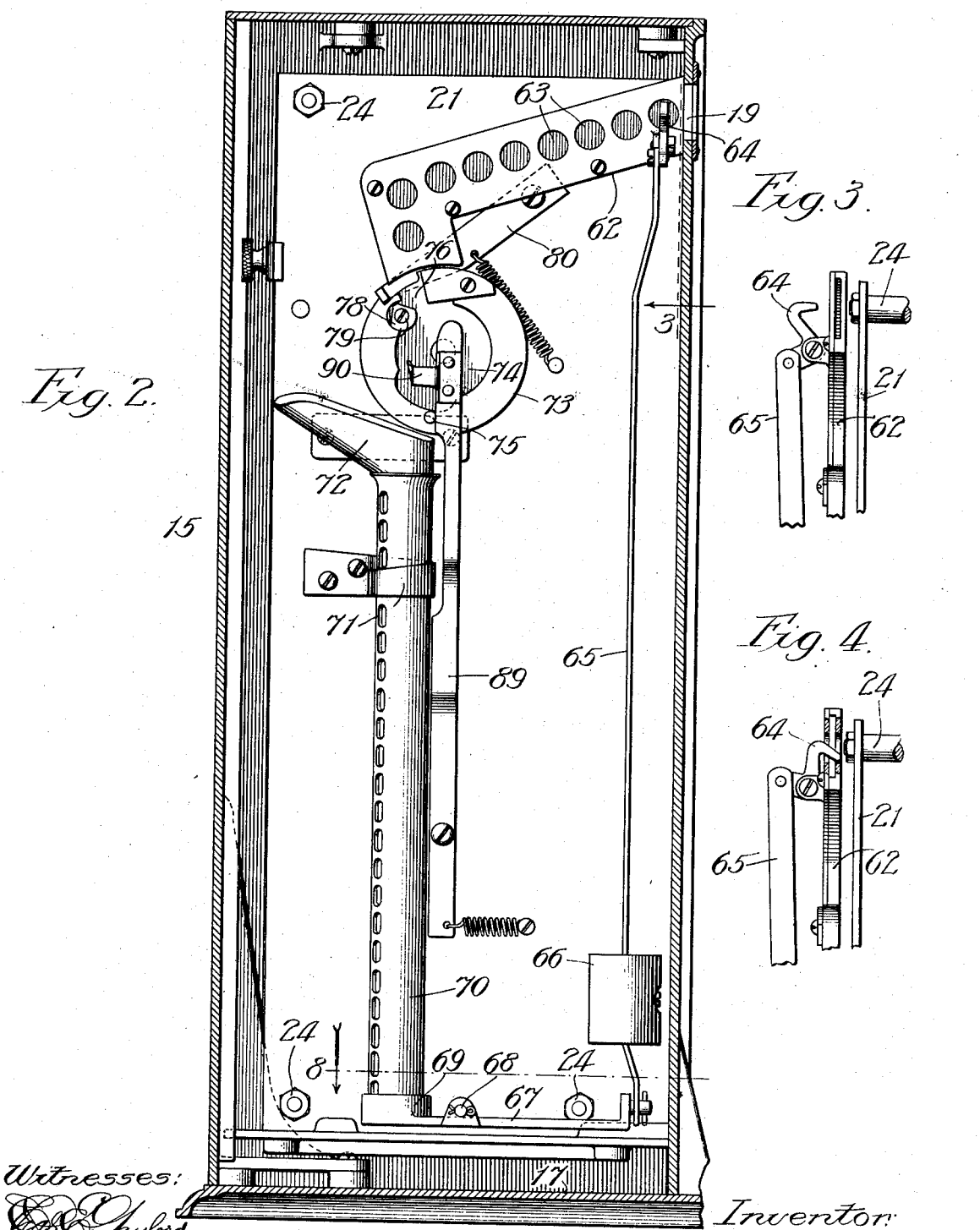

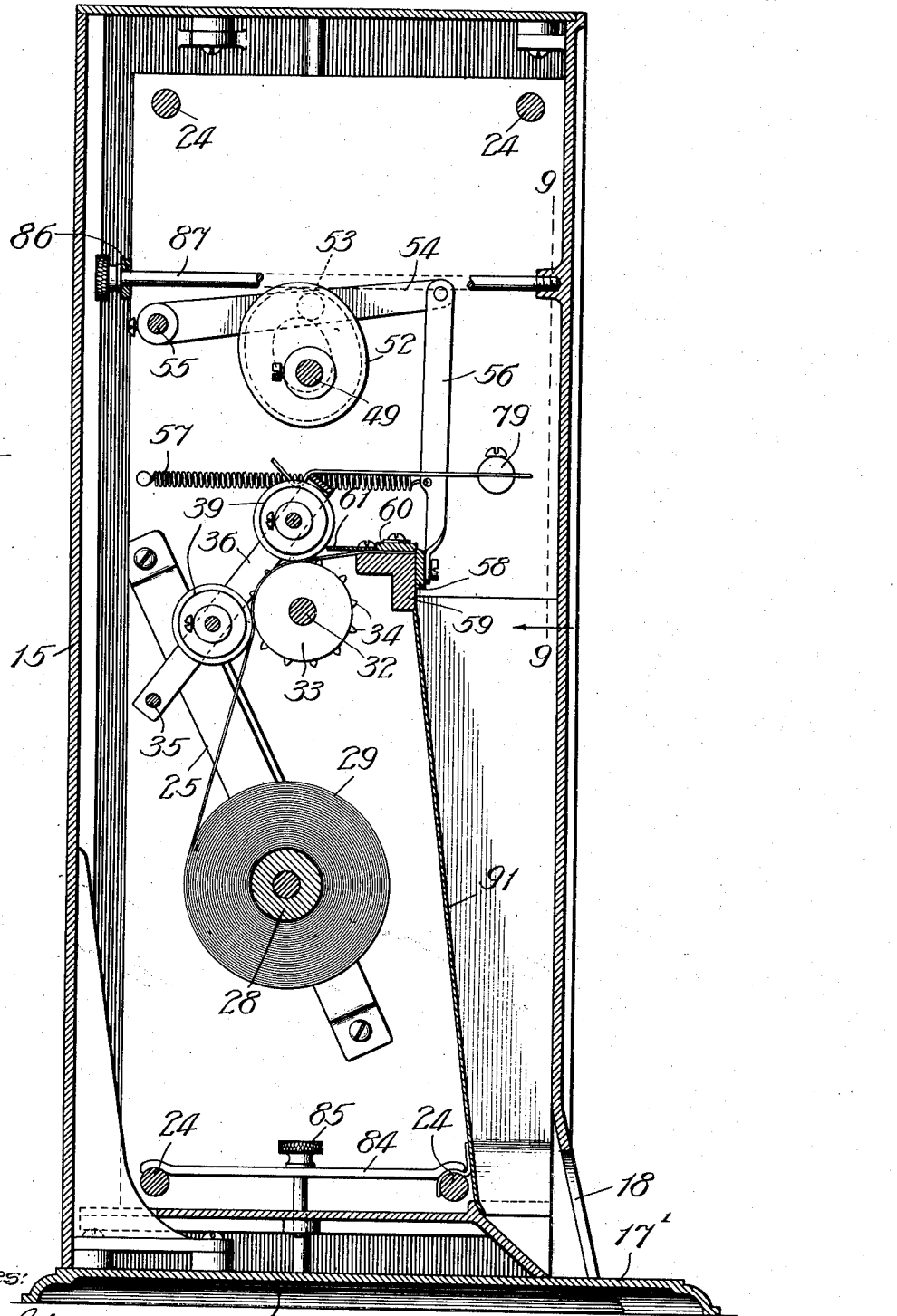

G. W. STAMBAUGH.
COUPON DELIVERY MACHINE.
APPLICATION FILED JULY 28, 1910.

976,517.

Patented Nov. 22, 1910.
5 SHEETS—SHEET 4.

Witnesses:
Chas. E. Gaylord.
Chas. H. Buell.

Inventor:
George W. Stambaugh,
By Dyrenforth, Lee, Chritton & Wiles,
Attys.

G. W. STAMBAUGH.
COUPON DELIVERY MACHINE.
APPLICATION FILED JULY 28, 1910.
976,517.
Patented Nov. 22, 1910.
5 SHEETS—SHEET 5.
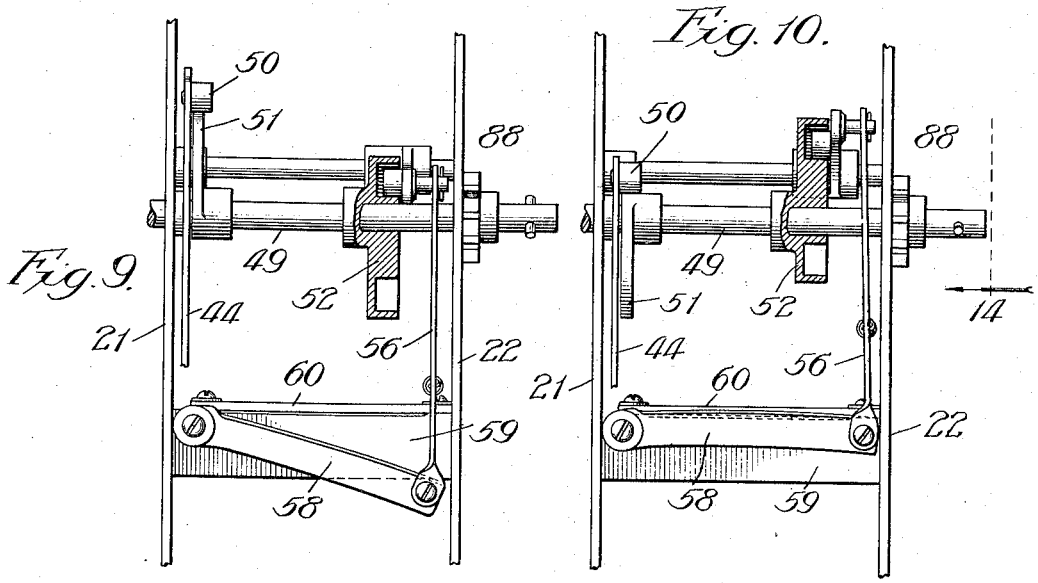
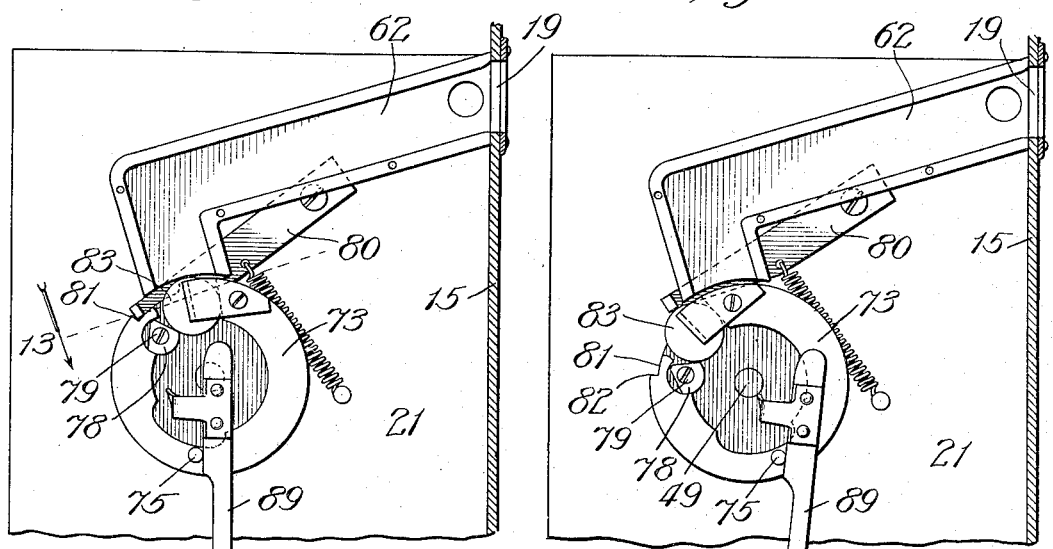
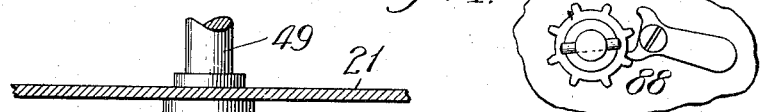
Witnesses:
Inventor:
George W. Stambaugh
By Dyrenforth, Lee, Chritton & Wiles
Attys.

UNITED STATES PATENT OFFICE.

GEORGE W. STAMBAUGH, OF CHICAGO, ILLINOIS, ASSIGNOR TO MILLS NOVELTY COMPANY, OF CHICAGO, ILLINOIS, A CORPORATION OF ILLINOIS.

COUPON-DELIVERY MACHINE.

976,517.   Specification of Letters Patent.   Patented Nov. 22, 1910.

Application filed July 28, 1910. Serial No. 574,221.

*To all whom it may concern:*

Be it known that I, GEORGE W. STAMBAUGH, a citizen of the United States, residing at Chicago, in the county of Cook and State of Illinois, have invented a new and useful Improvement in Coupon - Delivery Machines, of which the following is a specification.

My invention relates to an improvement in the class of machines in which normally-locked mechanism is rendered operative, upon being released through the medium of an inserted coin of proper denomination, to feed a continuous strip of paper or other suitable material, representing a series of coupons or tickets, past a cutter, and to sever, by each operation, a coupon or ticket from the strip and deliver the same, which may tell a fortune, represent a bank-deposit, or serve some other predetermined purpose.

The improvement consists in the details of construction and combinations of parts hereinafter described and claimed.

Figure 1:
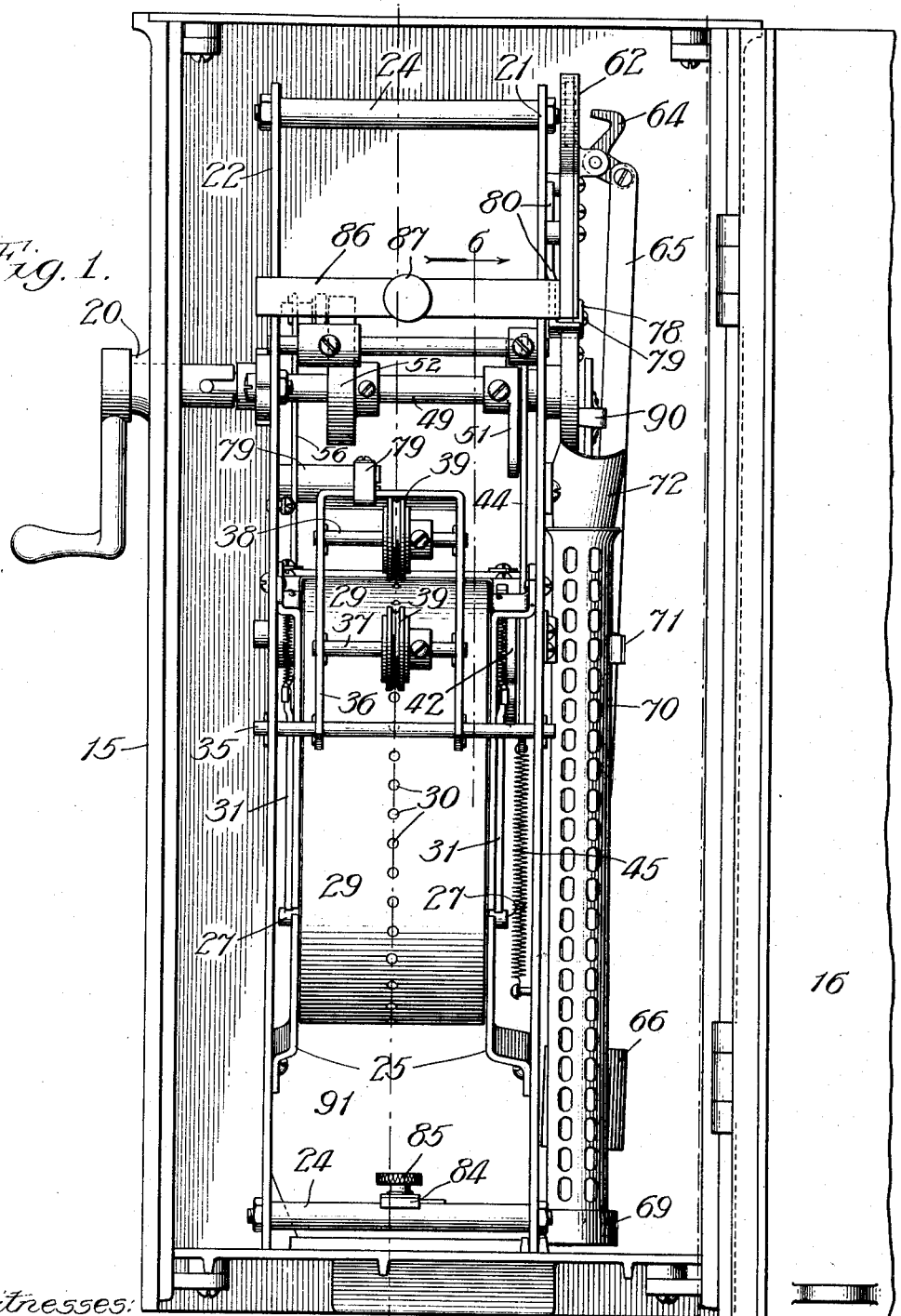
Figure 6:
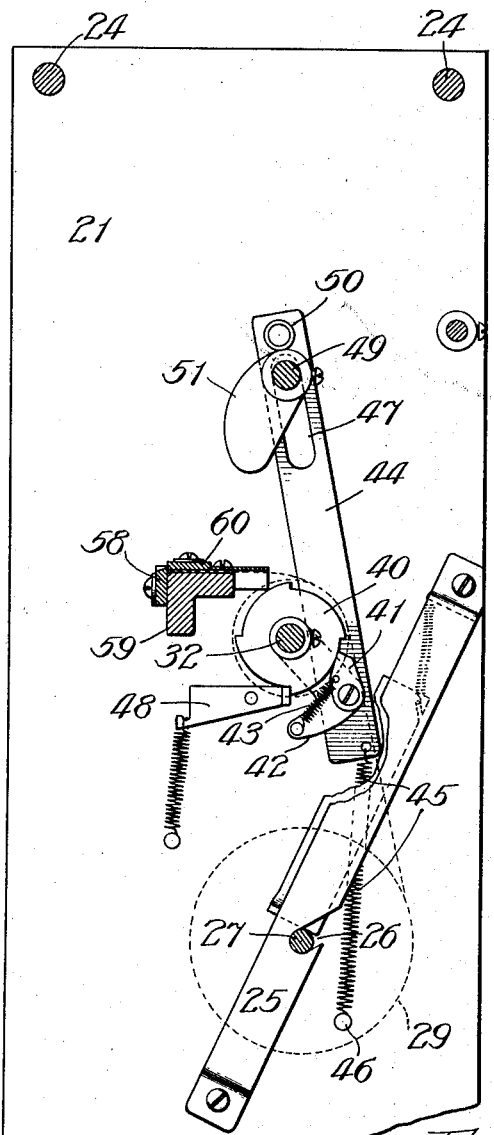
Figure 7:
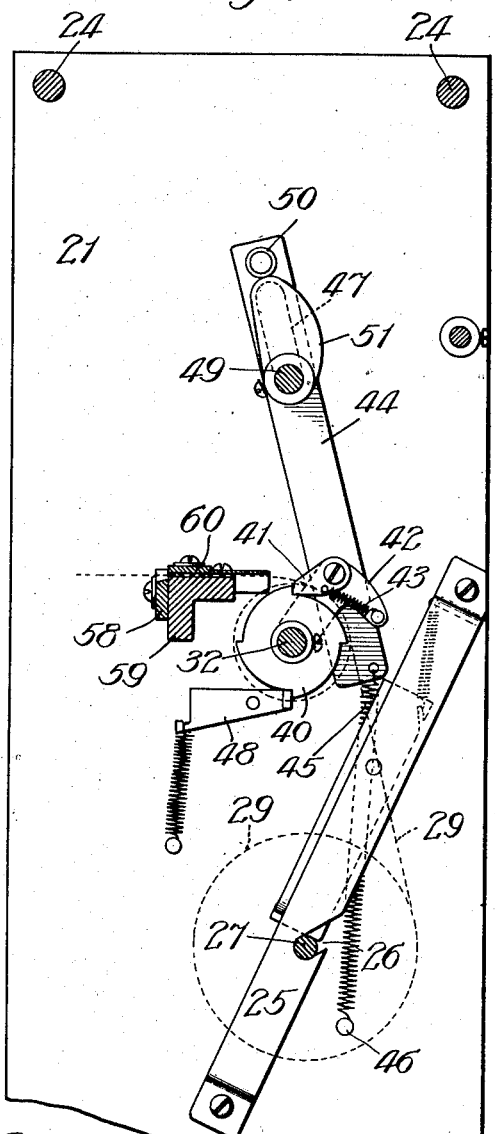
Figure 8:
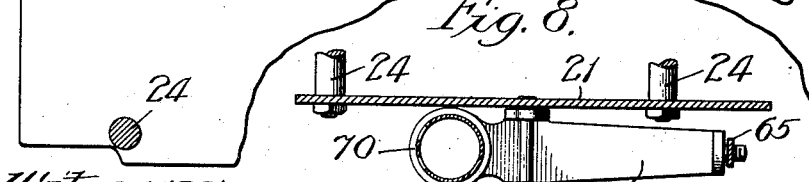

In the accompanying drawings, Figure 1 is a view of the machine in rear elevation, with the combined back and base of the case, to which the latter is hinged, in open condition; Fig. 2 is a section on line 2, Fig. 1; Fig. 3 is a broken section on line 3, Fig. 1, showing the coin-chute closing-finger in its normal inoperative condition, and Fig. 4 is a similar view showing the same in its chute-closing condition; Fig. 5 is a vertical central section of the machine on line 5, Fig. 1; Fig. 6 is a section on line 6, Fig. 1, showing the coin - actuated strip - feeding mechanism in normal position; Fig. 7 is a similar view showing the same in the condition of the parts at completing the feed of a coupon-section of the strip across the cutter prior to severing it; Fig. 8 is a section on line 8, Fig. 2, showing the oscillatory coin-magazine; Fig. 9 is a section on line 9, Fig. 5, showing the coin-actuated strip-severing mechanism in normal position; Fig. 10 is a similar view of the same in the position of the parts they occupy at the end of the severing operation; Fig. 11 is a broken sectional view showing, in face elevation, the coin-released trip-mechanism in normal condition at the end of the coin-chute; Fig. 12 is a similar view of the same after it has been tripped through the medium of an inserted coin; Fig. 13 is an enlarged broken section on line 13, Fig. 11, and Fig. 14 is a view taken at the line 14 on Fig. 10, showing the pawl and ratchet device provided on the operating shaft of the device to prevent reversal thereof.

The entire mechanism is contained in a case 15, shown of rectangular cross-section, the front and lateral walls and top and bottom heads of which are rigidly united, while the back 16 has hinged to it at one edge that of an adjacent lateral wall and rises from a base 17 on which the hinged part of the case rides in opening and closing it, with the hinges as the axis. In the lower end of the front side of the case is formed a delivery-opening 18 at an extension 17' of the base forming a ledge, and in the upper left-hand corner of that side is provided a coin-insertion slot 19, while in one side of the case, above its transverse center, is formed a shaft-bearing 20.

All of the parts of the strip-delivery and severing mechanisms are contained between two parallel vertical plates 21 and 22, joined in spaced relation near their corners by horizontal rods 24. Members of a pair of angular bars 25 are fastened to the opposite inner faces of the plates to extend inclinedly in parallel relation; and they are provided on their rear edges with inclined notches 26 forming the bearings for the journals 27 of a roller 28 carrying in a roll the strip or ribbon 29 of paper on the face of which the series of coupons or tickets may be printed and which is provided along its longitudinal center with a line of perforations 30 uniformly spaced apart, (Fig. 1). Spring-pressed fingers 31 are pivoted between their ends to the outer sides of the inclined bars 25 to extend at their lower ends adjacent to the journals 27 for preventing accidental unseating thereof from their bearings 26, while permitting the roller to be readily removed on turning the fingers 31 out of the way of obstructing the journals.

A shaft 32, journaled at its ends in the plates 21, 22 near their centers, carries, to aline with the series of perforations in the strip 29, a sprocket 33 provided with uniformly spaced peripheral teeth 34; and on a rod 35 extending between the plates below and behind the shaft 32 is hung, in a manner to permit swinging it up and down, a rectangular frame 36, having shafts 37 and 38 journaled in its side-members and carrying near their centers friction-rollers 39 to bear against the strip 29 where it passes over the sprocket 33 to be fed by its teeth through the severing-device, hereinafter described, the weight of the frame 36 bearing against the back of the strip thus causing the latter to be positively engaged at its perforations by the sprocket-teeth 34 for rendering the feed reliably true.

The shaft 32 carries, near one end, a toothed wheel 40 shown to be provided with four teeth equidistant apart. A spring-pressed pawl 41 engages the wheel 40 to actuate it, and to that end is pivotally supported on a bent lever 42 loosely supported on the shaft 32 and with which the pawl has a spring-connection 43 for holding it in its operative engagement; and the lever is fulcrumed between its ends to a reciprocating arm 44 connected from its lower end, by a retracting spring 45, with a stud 46 on the plate 21, this arm containing a longitudinal slot 47 in its upper-end portion. A spring-pressed detent 48, pivotally supported on the plate 21, also engages the wheel 40. The operating shaft 49 is journaled in the bearing 20 on the case and in bearings in the plates 22 and 21, through which it passes, and it is embraced near its inner end by the slotted end of the arm 44 which carries an anti-friction roller 50 engaging a cam 51 on that shaft, which is provided on its end beyond the bearing 20 with a crank-handle.

On the operating shaft is secured to rotate with it a cam 52 having a groove in its outer face into which projects a stud 53 on a lever 54 secured at one end to a rock-shaft 55 journaled in the plates 21 and 22 above the rod 35; the opposite end of this lever being connected by a depending link 56, which has a spring-connection 57 with the plate 22, with the free end of a shearing-blade 58 fulcrumed at its opposite end to the stationary angular coöperating member 59 of the strip-severing device, which extends between the two plates and is surmounted by a bar 60 forming a space underneath it for the passage of the advance-end of the coupon-strip across the path of the blade and from which extends transversely a guide-shield 61 for the strip. The normal position of the blade 58 is that represented in Fig. 9, of extending inclinedly in a downward direction to exert its severing action upwardly.

The coin-chute 62, which has a downwardly-turned inner end concaved at its extremity, is rigidly fastened to the outer face of the plate 21 in position to register its inlet-end with the insertion-slot 19, and the outer wall of the chute is shown to be provided with a series of openings 63, adjacent to the outermost of which is pivotally supported an angular finger 64 in a position adapting it to be turned through that opening into the coin-path through the chute for the purpose hereinafter explained. A link-bar 65 carrying a weight 66 connects the finger 64 with one end of a lever 67, fulcrumed between its ends at 68 on the plate 21, and provided on its inner end with a seat 69 for a cylindrical coin-magazine 70, releasably fastened in place by a spring-clip 71 extending from the said plate, the magazine having a hopper 72 removably seated in its upper end. The purpose of thus supporting the magazine is to cause it, by its weight when filled to its capacity with coins, to overbalance the weight 66 and depress the seat-end of the lever 67, thereby raising the opposite end thereof and with it the link 65 with the effect of turning the stop-finger through the respective opening 63 into the path through the chute so near its inlet-end as to prevent the insertion of another coin.

Between the discharge-end of the chute and the hopper 72 is located the coin-tripped mechanism which requires the coöperation of an inserted coin to permit the machine to be operated.

On the end of the shaft 49 which projects through the plate 21 is secured to rotate concentrically with that shaft a disk 73 provided with a concave or chambered outer face 74, from the margin of which a stud 75 projects. A slot 76 extends from the chamber 74 through the periphery of this disk, which is formed with a recess 77 at one end and has at its opposite end a stop-head 78 let into the chambered face and fastened, as by a screw. A spring-pressed latch 80, which is pivoted at one end to the plate 21 to extend behind the chute, normally enters at its free end into a long rectangular notch 81 in the periphery of the disk at the slot 76 therein. This catch normally engages the shoulder 82 presented by one end of the notch to arrest the disk in position to register its recessed slot 76 with the delivery-end of the chute, and prevents, in the absence of a coin 83 (as a dime) in the slot, further turning of the disk than will bring the opposite shoulder of the notch against the catch, which extent of turning is only slight and insufficient to operate the machine.

With the machine in operative condition, the plates 21 and 22 carrying the mechanism, as described, stand in upright position in the case and are rigidly fastened in place as by a strap 84 bearing at its ends against the two lower brace-rods 24 and fastened by a thumb-screw 85 passing through its center into the lower head of the case, and a strap 86 bearing at its ends against corresponding edges of the plates 21 and 22 and fastened by a suitably long thumb-screw 87 passing centrally through it into the front wall of the case; the free end-portion of the strip 29 is passed over the wheel 33, the teeth of which engage perforations 30 in the strip, with its advance-end extending under the shield 61 into the space underneath the bar 60 and the gravity-frame 36 bears against the back of the end-portion of the strip 29 on the wheel 33 and is held in that position by a spring-catch 79 extending over the rail at its free end from a stud 79' on the plate 22. The case is locked to the back by a padlock (not shown).

Upon inserting a coin into the slot 19, it rolls down the chute and drops into the recessed slot 81 in the position represented in Fig. 11. Upon then turning the shaft 32 by its handle the following described operations ensue: Resultant turning of the disk 78 causes the coin to raise the latch 80 out of the notch 81 and permit the disk to be freely rotated, resting at its periphery against the free end of the latch. Backward turning of the shaft is prevented by the pawl and ratchet device 88 (Fig. 14) provided at its outer end, as shown in Figs. 9 and 10. When, in the turning of the disk, its slot 76 arrives over the hopper 72, the coin drops into the latter and lodges in the magazine; and meantime the stud 75 engages a spring-pressed lever 89, fulcrumed near its lower end to the plate 21 and provided near its upper end with a yoke 90 extending at its free end close to the base of the chambered central part of the disk, this engagement forcing the lever against the resistance of its controlling-spring until the coin attains its discharging position, when the stud 75 will have cleared the upper end of the lever 89, permitting the spring to snap the latter back and impel the yoke against the coin, in the event of its sticking, thereby to insure dislodgment thereof. While the disk is being thus turned, the cam 51 engages the roller 50 to raise the arm 44 and engage the pawl 41 with a tooth of the wheel 40, thereby turning the latter sufficiently to rotate the wheel just enough to protrude a length of the advance-end of the strip past the blade 58, for a coupon. Thereupon the cam 51 clears the roller 50, permitting the spring 45 to retract the arm 44 to bring the pawl 41 into position to engage the succeeding tooth of the wheel 40 for the next strip-feeding operation of the machine. The operations are so timed that when the advance-end of the strip has been protruded, as described, the cam 52 is brought into action, engaging the stud 53 to raise the lever 54 and link 56, thereby raising the blade 58 to sever the protruding end of the strip which falls, as a coupon or ticket, down an apron 91 leading to the delivery-outlet 18, through which the coupon alights upon the ledge 17' to be taken up by the operator. The further movement of the cam 52 restores the blade to its normal lowered position, ready for the next operation of the machine, when the disk 73 will have arrived at its normal position of registering its notch with the catch 80 to be locked thereby.

What I claim as new and desire to secure by Letters Patent is—

1. In a coupon-delivering machine, the combination of a case having a delivery-outlet, a pair of upright spaced plates housed in the case, a coupon-strip-carrying roller, feeding mechanism for the strip comprising a shaft, said shaft and roller being journaled to extend between said plates, a sprocket on the shaft and a toothed wheel thereon near one end, a slotted spring-retracted arm carrying an anti-friction roller, a finger pivoted to said arm, a spring-pressed pawl pivoted to the finger to engage said wheel, an operating shaft journaled in said plates, carrying an operating handle on its outer end and extending at its opposite end through the slot in said arm, and a cam on the operating shaft engaging the anti-friction roller, and strip-severing mechanism supported on said plates and connected with the operating shaft to be actuated thereby succeeding the operation of the feeding mechanism, and discharging to said outlet, for the purpose set forth.

2. In a coupon-delivering machine, the combination of a case having a delivery-outlet, a pair of upright spaced plates housed in the case, a pair of inclined bars on the inner faces of said plates, a coupon-strip-carrying roller journaled on said bars, feeding mechanism for the strip supported on said plates to work between them and comprising a shaft, a sprocket and a toothed wheel thereon, a roller-carrying swinging gravity-frame releasably bearing against the sprocket, a slotted spring-retracted arm carrying an anti-friction roller, a finger pivoted to said arm, a spring-pressed pawl pivoted to the finger to engage said wheel, an operating shaft carrying an operating handle on its outer end and extending at its opposite end through the slot in said arm, and a cam on the operating shaft engaging the anti-friction roller, and strip-severing mechanism supported to work between said plates and connected with the operating shaft to be actuated thereby succeeding the operation of the feeding mechanism, and discharging to said outlet, for the purpose set forth.

GEORGE W. STAMBAUGH.

In presence of—
J. G. ANDERSON,
R. A. SCHAEFER.